(12) United States Patent
Tsujiuchi et al.

(10) Patent No.: US 11,306,636 B2
(45) Date of Patent: Apr. 19, 2022

(54) PLANT AND AIR POLLUTION CONTROL METHOD

(71) Applicant: Mitsubishi Heavy Industries Engineering, Ltd., Kanagawa (JP)

(72) Inventors: Tatsuya Tsujiuchi, Tokyo (JP); Takahito Yonekawa, Tokyo (JP); Takashi Kamijo, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 56 days.

(21) Appl. No.: 17/050,260

(22) PCT Filed: Apr. 19, 2019

(86) PCT No.: PCT/JP2019/016761
§ 371 (c)(1),
(2) Date: Oct. 23, 2020

(87) PCT Pub. No.: WO2019/208416
PCT Pub. Date: Oct. 31, 2019

(65) Prior Publication Data
US 2021/0079823 A1 Mar. 18, 2021

(30) Foreign Application Priority Data
Apr. 24, 2018 (JP) .............................. JP2018-083280

(51) Int. Cl.
*F01N 3/18* (2006.01)
*F02C 1/10* (2006.01)
*F02C 3/00* (2006.01)

(52) U.S. Cl.
CPC .................. *F01N 3/18* (2013.01); *F02C 1/10* (2013.01); *F02C 3/00* (2013.01); *F05D 2220/32* (2013.01); *F05D 2220/62* (2013.01)

(58) Field of Classification Search
CPC ...... F01N 3/18; F02C 1/10; F02C 3/00; F05D 2220/32; F05D 2220/62; B01D 53/343;
(Continued)

(56) References Cited

U.S. PATENT DOCUMENTS

| 4,942,734 A | 7/1990 | Markbreiter et al. |
| 6,412,285 B1 * | 7/2002 | Ranasinghe .............. F02C 7/18 60/39.182 |

(Continued)

FOREIGN PATENT DOCUMENTS

| JP | 2009-248081 A | 10/2009 |
| JP | 2018-099647 A | 6/2018 |
| WO | 2011-155886 A1 | 12/2011 |

OTHER PUBLICATIONS

English Translation of International Search Report in corresponding International Application No. PCT/JP2019/016761, dated Jun. 18, 2019 (2 pages).

(Continued)

*Primary Examiner* — Hoang M Nguyen
(74) *Attorney, Agent, or Firm* — Osha Bergman Watanabe & Burton LLP (57) ABSTRACT

A plant according to an embodiment includes a gas turbine; a heat recovery unit that includes a primary heat recovery steam generator in which a primary heat exchanging unit generates primary steam by exchanging heat that is the thermal energy of the flue gas from the gas turbine, and a secondary heat recovery steam generator that is installed independently from the primary heat exchanging unit, and in which a secondary heat exchanging unit generates secondary steam by exchanging heat that is the thermal energy of the flue gas partly having exchanged heat in the primary heat exchanging unit included in the primary heat recovery steam (Continued)

generator; a primary steam turbine; a $CO_2$ recovery unit; and a first reboiler heat supply line.

7 Claims, 8 Drawing Sheets

(58) Field of Classification Search
CPC ........ B01D 2252/204; B01D 2257/504; B01D 2258/0283; B01D 53/1475; B01D 53/62; Y02C 20/40; F01K 17/02; F01K 23/10
USPC ...................................................... 60/39.182
See application file for complete search history.

(56) References Cited

U.S. PATENT DOCUMENTS

| | | | |
|---|---|---|---|
| 8,683,809 | B2 | 4/2014 | Grumann et al. |
| 9,027,348 | B2 | 5/2015 | Grumann et al. |
| 2009/0252659 | A1 | 10/2009 | Iijima et al. |
| 2012/0312020 | A1 | 12/2012 | Hume et al. |
| 2013/0119667 | A1* | 5/2013 | Christensen ......... H02K 7/1823 60/39.182 |
| 2013/0205796 | A1* | 8/2013 | Christensen .............. F01N 3/00 60/772 |
| 2014/0116063 | A1* | 5/2014 | Deng ........................ F01K 7/38 60/39.461 |
| 2015/0210610 | A1* | 7/2015 | Rafique .................... C07C 2/82 585/315 |

OTHER PUBLICATIONS

Written Opinion of the International Searching Authority in corresponding International Application No. PCT/JP2019/16761, dated Jun. 18, 2019 (17 pages).
Extended European Search Report issued in corresponding European Application No. 19793714.7, dated Jan. 7, 2022 (8 pages).

* cited by examiner

PLANT AND AIR POLLUTION CONTROL METHOD

FIELD

The present invention relates to a plant and an air pollution control method.

BACKGROUND

As one example of a highly efficient power generator facility that uses a fossil fuel, a gas turbine combined cycle (hereinafter, also referred to as GTCC) power plant has been known. A GTCC power plant achieves a high power generation efficiency by generating power not only using a gas turbine, but also by using resultant exhausted heat in a heat recovery steam generator (hereinafter, also referred to as an "HRSG") to generate power using a steam turbine.

There are some GTCC power plants provided with a $CO_2$ (carbon dioxide) recovery unit for reducing $CO_2$ emissions by recovering $CO_2$ contained in the flue gas from the gas turbine. This $CO_2$ recovery unit includes a $CO_2$ absorber for absorbing $CO_2$ contained in the flue gas using a $CO_2$ absorbent (e.g., amine absorbent), and an absorbent regenerator for desorbing $CO_2$ from the $CO_2$ absorbent having absorbed the $CO_2$. The absorbent regenerator in the $CO_2$ recovery unit includes a reboiler for generating steam for desorbing the $CO_2$ from the $CO_2$ absorbent. The absorbent regenerator recovers highly pure $CO_2$ and regenerates the $CO_2$ absorbent by heating the $CO_2$ absorbent having absorbed the $CO_2$, using the steam generated by the reboiler, to cause the $CO_2$ contained in the $CO_2$ absorbent to be desorbed and dissipated, and sends the regenerated $CO_2$ absorbent to the $CO_2$ absorber, so that the $CO_2$ absorbent is circulated and reused in the $CO_2$ absorber.

Patent Literature 1 and Patent Literature 2 disclose a plant for bleeding a part of the steam generated in an HRSG provided downstream of the gas turbine, and having a reboiler in a $CO_2$ recovery unit.

CITATION LIST

Patent Literature

Patent Literature 1: U.S. Pat. No. 9,027,348
Patent Literature 2: U.S. Pat. No. 8,683,809

SUMMARY

Technical Problem

In such a plant having the GTCC and the $CO_2$ recovery unit, when the power demand changes while the gas turbine is in operation, the load imposed on the $CO_2$ recovery unit also changes. Furthermore, when the amount of steam bled from the heat recovery steam generator changes, the steam turbine is affected more, and the operation of the plant becomes complicated. In this manner, as the operation condition of the $CO_2$ recovery unit changes, the condition of the steam (e.g., the temperature, the pressure, or the flow rate) may change accordingly and affect the operation of the steam turbine, resulting in a drastic change in the output power, for example.

To address the issue described above, an object of the present invention is to provide a plant and an air pollution control method for reducing the fluctuations in the power generated by the steam turbine, in face of changes in the operation conditions during irregularities, e.g., while the gas turbine is started or when the load fluctuates.

Solution to Problem

A plant according to the present invention comprising: a gas turbine; a heat recovery unit that includes a primary heat recovery steam generator in which a primary heat exchanging unit generates primary steam by exchanging heat that is thermal energy of flue gas from the gas turbine, and a secondary heat recovery steam generator installed independently from the primary heat exchanging unit, and in which a secondary heat exchanging unit generates secondary steam by exchanging heat that is thermal energy of the flue gas having exchanged heat in the primary heat exchanging unit included in the primary heat recovery steam generator; a primary steam turbine that is driven by the primary steam generated by the primary heat recovery steam generator; a $CO_2$ recovery unit that includes a reboiler for recovering $CO_2$ contained in the flue gas discharged from the heat recovery unit; and a first reboiler heat supply line via which the secondary steam generated by the secondary heat recovery steam generator is guided to the reboiler.

An air pollution control method according to the present invention for recovering $CO_2$ from a gas turbine combined cycle power plant, the air pollution control method comprising: a primary heat recovery step at which a primary heat exchanging unit exchanges heat that is thermal energy of flue gas from the gas turbine; a secondary heat recovery step that is independent from the primary heat recovery step, and at which thermal energy of the flue gas having exchanged heat at the primary heat recovery step in the primary heat exchanging unit is recovered; a $CO_2$ recovery step that includes a reboiler for recovering $CO_2$ contained in the flue gas discharged at the secondary heat recovery step, wherein secondary steam having exchanged heat at the secondary heat recovery step is guided to the reboiler.

Advantageous Effects of Invention

According to the present invention, in the gas turbine combined cycle power plant, the steam turbine is less affected by the steam bled from the primary heat recovery steam generator and drawn off into the steam turbine, and the amount of power generated by the steam turbine fluctuates less, in face of changes in operation conditions during irregularities, e.g., while the gas turbine is started or when the load fluctuates.

DESCRIPTION OF EMBODIMENTS

Some preferred embodiments of the present invention will now be explained in detail with reference to the appended drawings. However, these embodiments are not intended to limit the scope of the present invention in any way. When the embodiment is described in plurality, any combinations thereof also fall within the scope of the present invention.

First Embodiment

Figure 1:
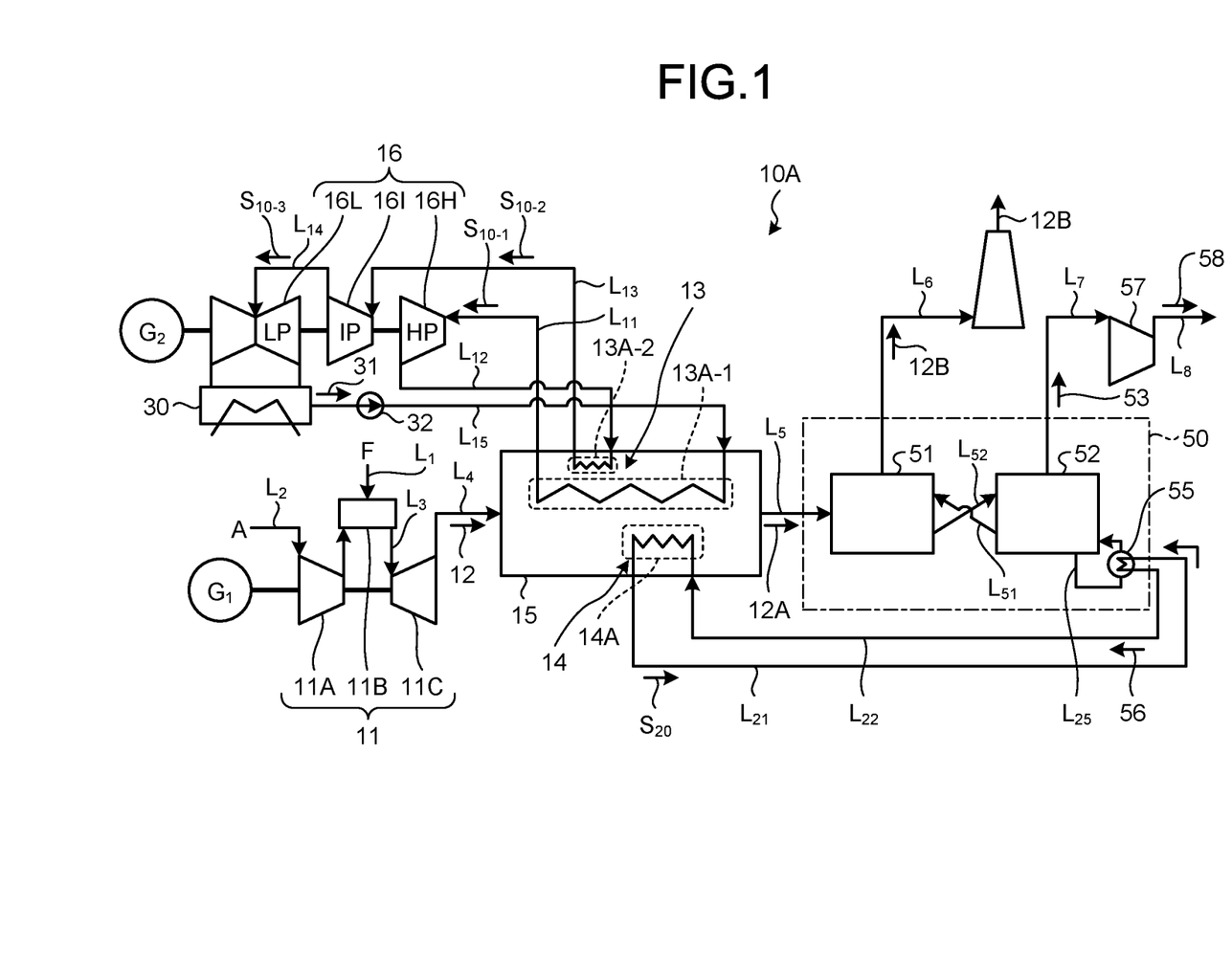
FIG. 1 is a schematic of a plant according to a first embodiment.

FIG. 1 is a schematic of a plant according to a first embodiment. Explained in this embodiment is an example in which a plant 10A is used as a power plant, but the plant 10A may be used in various applications for taking out energy resultant from combusting a fuel. As illustrated in FIG. 1, the plant 10A according to this embodiment includes: a gas turbine 11; a heat recovery unit 15 that includes a primary heat recovery steam generator (primary HRSG) 13 in which primary heat exchanging units 13A (13A-1, 13A-2) generate primary steam $S_{10}$ by exchanging heat that is the thermal energy of flue gas 12 from the gas turbine 11, and a secondary heat recovery steam generator (secondary HRSG) 14 that is installed independently from the primary heat exchanging units 13A, and in which a secondary heat exchanging unit 14A generates secondary steam or heated water by exchanging the heat that is the thermal energy of the flue gas 12 partly having exchanged heat in the primary heat exchanging units 13A included in the primary heat recovery steam generator 13; a primary steam turbine 16 that is driven by the primary steam $S_{10}$ ($S_{10-1}$, $S_{10-2}$, $S_{10-3}$) generated by the primary heat recovery steam generator 13; a $CO_2$ recovery unit 50 that includes a reboiler 55 for recovering $CO_2$ contained in the flue gas 12 discharged from the heat recovery unit 15; and a first reboiler heat supply line $L_{21}$ via which secondary steam $S_{20}$ generated by the secondary heat recovery steam generator 14 is guided to the reboiler 55. The primary steam turbine 16 includes a high-pressure steam turbine 16H, a medium-pressure steam turbine 16I, and a low-pressure steam turbine 16L.

In this embodiment, the primary heat recovery steam generator 13 for obtaining the primary steam $S_{10}$ ($S_{10-1}$, $S_{10-2}$, $S_{10-3}$) for driving the primary steam turbine 16, and the secondary heat recovery steam generator 14 for obtaining the heat to be used for purposes other than in the primary steam turbine 16 are disposed inside of the one heat recovery unit 15.

The gas turbine 11 includes an air compressor 11A, a combustor 11B, and a power turbine 11C. The air compressor 11A includes compressor vanes and compressor blades that are arranged alternatingly in a plurality of stages, and compresses intake air A collected from the external, and guides the high-temperature, high-pressure compressed air into the combustor 11B. The combustor 11B injects fuel F into the high-temperature, high-pressure compressed air guided from the air compressor 11A, and combusts the fuel F to generate high-temperature combustion gas (e.g., at 1500 degrees Celsius). The power turbine 11C includes turbine vanes and turbine blades that are arranged alternatingly in a plurality of stages, and combustion gas generated in the combustor 11B is passed therethrough. In the power turbine 11C, the turbine vanes are rotated by the energy of the combustion gas, as the combustion gas is passed therethrough. The rotational shafts of the power turbine 11C and of the air compressor 11A are connected to each other. In the gas turbine 11, the combustion gas is injected onto the power turbine 11C, and the power turbine 11C converts the thermal energy of the high-temperature, high-pressure combustion gas into a rotational energy. This rotational energy drives the air compressor 11A that is disposed coaxially with the power turbine 11C. A generator Gi is connected to the rotational shaft of the gas turbine 11, and the generator Gi is driven by the rotational energy, and generates power. The flue gas 12 having driven the power turbine 11C is discharged to the heat recovery unit 15. In the heat recovery unit 15, the primary heat recovery steam generator 13 and the secondary heat recovery steam generator 14 included in the heat recovery unit 15 recover the thermal energy from the flue gas 12.

The primary heat recovery steam generator 13 includes the primary heat exchanging unit 13A-1 and the primary heat exchanging unit 13A-2. A first steam line $L_{11}$ connects the primary heat exchanging unit 13A-1 in the primary heat recovery steam generator 13 to the high-pressure steam turbine 16H. A second steam line $L_{12}$ connects the high-pressure steam turbine 16H to the primary heat exchanging unit 13A-2. A third steam line $L_{13}$ connects the primary heat exchanging unit 13A-2 to the medium-pressure steam turbine 16I. A fourth steam line $L_{14}$ connects the medium-pressure steam turbine 16I to the low-pressure steam turbine 16L, and guides the primary steam $S_{10-3}$ to the low-pressure steam turbine 16L. A condensate line $L_{15}$ connects a condenser 30 to the primary heat exchanging unit 13A-1, and guides condensate 31 to the primary heat exchanging unit 13A-1. A pressurizing pump 32 is inserted to the condensate line Lis, and pressurizes the condensate 31.

The primary heat exchanging unit 13A-1 exchanges heat between the condensate 31 supplied from the condenser 30 and the flue gas 12. The condensate 31 having exchanged heat with the flue gas 12 is turned into the primary steam $S_{10-1}$ (e.g., at 550 degrees Celsius). The primary steam $S_{10-1}$ is sent to the high-pressure steam turbine 16H via the first steam line $L_{11}$, and drives the high-pressure steam turbine 16H.

The primary heat exchanging unit 13A-2 exchanges heat between the exhausted steam passed through the high-pressure steam turbine 16H and the flue gas 12. The exhausted steam is guided via the second steam line $L_{12}$ to the primary heat exchanging unit 13A-2 in the primary heat recovery steam generator 13, exchanges heat with the flue gas 12, and is turned into the primary steam $S_{10-2}$ (e.g., at 550 degrees Celsius). The primary steam $S_{10-2}$ is then sent to the medium-pressure steam turbine 16I via the third steam line Lis, and drives the medium-pressure steam turbine 16I. The primary steam $S_{10-3}$ (e.g., at 270 degrees Celsius) passed through the medium-pressure steam turbine 16I is then supplied to the low-pressure steam turbine 16L, and drives the low-pressure steam turbine 16L. The condenser 30 condenses the exhausted steam passed through the low-pressure steam turbine 16L into the condensate 31 (e.g., at 40 to 50 degrees Celsius) again.

The plant 10A also includes a fuel guide line $L_1$, an air guide line $L_2$, a combustion gas line $L_3$, and a combusted flue gas discharge line $L_4$. The fuel guide line $L_1$ guides the fuel F into the combustor 11B. The air guide line $L_2$ guides the air A into the air compressor 11A. The combustion gas line $L_3$ guides the fuel gas to the power turbine 11C. The combusted flue gas discharge line $L_4$ discharges the flue gas 12 from the power turbine 11C, and guides the flue gas 12 into the heat recovery unit 15.

The secondary heat recovery steam generator 14 includes the secondary heat exchanging unit 14A. The first reboiler heat supply line $L_{21}$ connects the secondary heat exchanging unit 14A to the reboiler 55. A condensed water line $L_{22}$ connects the reboiler 55 to the secondary heat exchanging unit 14A. In the secondary heat exchanging unit 14A, condensed water 56 from the reboiler 55 installed in the $CO_2$ recovery unit 50 exchanges heat with the flue gas 12 having exchanged heat in the primary heat exchanging units 13A, and is turned into the secondary steam $S_{20}$ (at 130 to 140 degrees Celsius). The first reboiler heat supply line $L_{21}$ then supplies the secondary steam $S_{20}$ into the reboiler 55, as reboiler steam.

The $CO_2$ recovery unit 50 include: a $CO_2$ absorber 51 in which the $CO_2$ absorbent (e.g., amine absorbent) absorbs the $CO_2$ in flue gas 12A discharged from the heat recovery unit 15; an absorbent regenerator 52 that desorbs the $CO_2$ from the $CO_2$ absorbent having absorbed $CO_2$ in the $CO_2$ absorber 51; and the reboiler 55 for generating steam for desorbing $CO_2$ from the $CO_2$ absorbent. The reboiler 55 is installed at the absorbent regenerator 52. The $CO_2$ recovery unit 50 allows the $CO_2$ absorbent having absorbed $CO_2$ to dissipate $CO_2$, by heating the $CO_2$ absorbent in the absorbent regenerator 52 indirectly with the steam from the reboiler 55, so that highly pure $CO_2$ is recovered, and the $CO_2$ absorbent is regenerated thereby.

The $CO_2$ absorbent having passed through the $CO_2$ absorber 51 and containing a large amount of $CO_2$ is referred to as a rich solution. The $CO_2$ absorbent regenerated in the absorbent regenerator 52 and containing a small amount of $CO_2$ is referred to as a lean solution. The lean solution is sent to the $CO_2$ absorber 51 via a lean solution line $L_{51}$, absorbs $CO_2$ in the $CO_2$ absorber 21, and is turned into the rich solution again. The rich solution is sent to the absorbent regenerator 52 via a rich solution line $L_{52}$. The $CO_2$ recovery unit 50 circulates and reuses the $CO_2$ absorbent in a closed space. The $CO_2$ absorbent may be any absorbent having a property for absorbing and releasing $CO_2$, without limitation to amine absorbent, and the present invention is not limited thereto.

Connected near the bottom of the absorbent regenerator 52 is a reboiler line $L_{25}$ provided with the reboiler 55 through which a part of the lean solution is circulated. A part of the lean solution regenerated in the absorbent regenerator 52 exchanges heat and becomes heated in the reboiler 55 inserted to the reboiler line $L_{25}$, and the resultant steam is circulated into the absorbent regenerator 52.

The $CO_2$ recovery unit 50 includes a first gas discharge line $L_6$, a second gas discharge line $L_7$, and a discharge line $L_8$. The first gas discharge line $L_6$ discharges processed gas 12B having $CO_2$ removed to the external, from the top of the $CO_2$ absorber 51. The second gas discharge line $L_7$ guides steam-containing $CO_2$ entrained gas 53 discharged from the top of the absorbent regenerator 52 into a $CO_2$ compressor 57. The discharge line $L_8$ discharges compressed $CO_2$ 58 compressed in the $CO_2$ compressor 57.

The secondary steam $S_{20}$ having exchanged heat in the secondary heat exchanging unit 14A in the secondary heat recovery steam generator 14 according to this embodiment has a temperature required for the $CO_2$ absorbent regeneration (e.g., 130 to 140 degrees Celsius) in the reboiler 55, and the temperature of the condensed water 56 coming out of the reboiler 55 is reduced to approximately 100 degrees Celsius, and is returned to the secondary heat exchanging unit 14A via the condensed water line $L_{22}$.

In the plant 10A according to this embodiment, the primary heat exchanging units 13A of the primary heat recovery steam generator 13 in the heat recovery unit 15 are provided independently from the secondary heat exchanging unit 14A in the secondary heat recovery steam generator 14. The secondary steam $S_{20}$ resultant of the heat exchange in the secondary heat recovery steam generator 14 is guided to the reboiler 55 via the first reboiler heat supply line $L_{21}$. With the plant 10A, by guiding the secondary steam $S_{20}$ to the reboiler 55, it is possible to drive the $CO_2$ recovery unit 50 separately and independently from the primary steam $S_{10}$ supplied to the primary steam turbine 16, in face of changes in the operation conditions, e.g., during a starting operation or a stopping operation of the $CO_2$ recovery unit 50. As a result, the condition of the steam (e.g., the temperature, the pressure, or the flow rate) to be guided into the primary steam turbine 16 changes less, and the primary steam turbine 16 is affected less. In this manner, because the plant 10A does not bleed the primary steam generated in the primary heat recovery steam generator 13 and supply the bled steam to the reboiler 55 of the $CO_2$ recovery unit 50, as has been conventionally practiced, it is possible to suppress fluctuations of the power output, as has been conventionally experienced, caused by bleeding a part of the steam of the primary heat recovery steam generator 13 to the $CO_2$ recovery unit 50.

Second Embodiment

Figure 2:
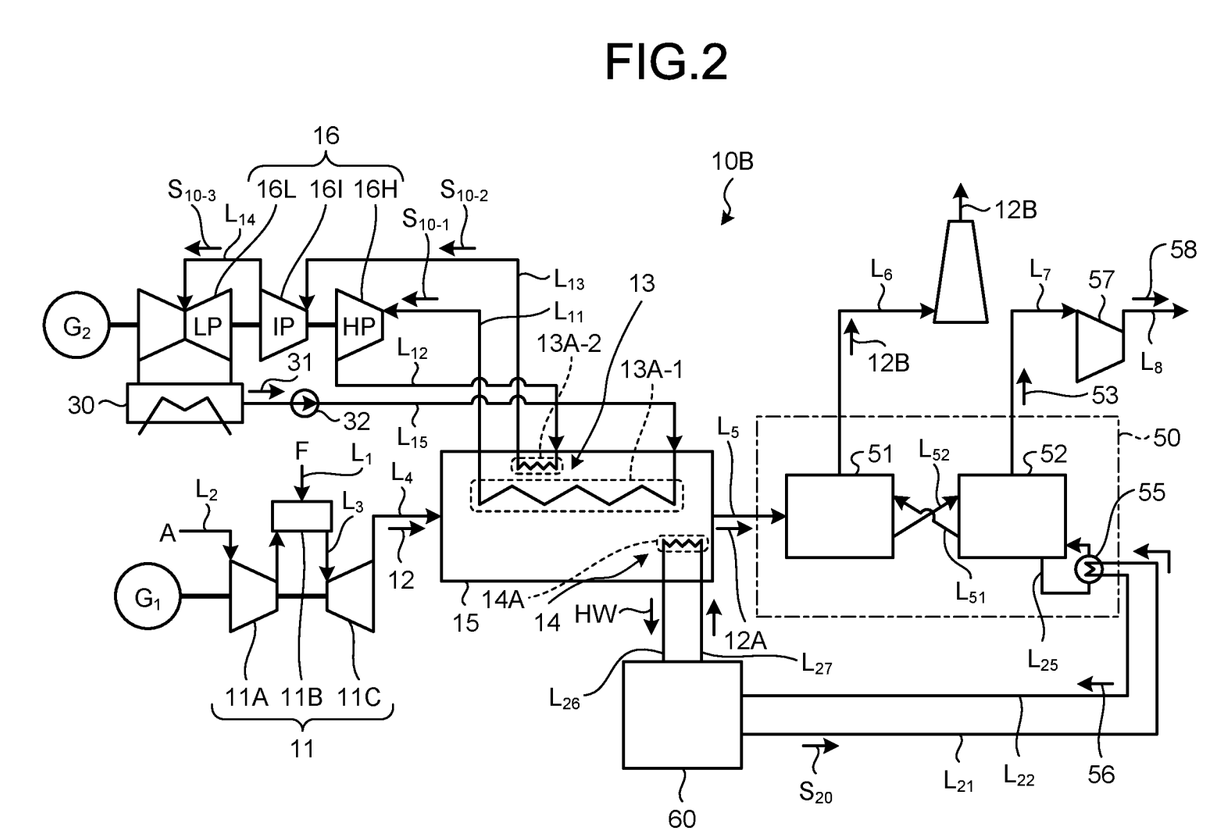
FIG. 2 is a schematic of a plant according to a second embodiment.

A plant according to a second embodiment of the present invention will now be explained with reference to FIG. 2. FIG. 2 is a schematic of the plant according to the second embodiment. Members that are the same as those in the first embodiment will be given the same reference signs, and explanations thereof will be omitted. In this plant 10B according to this embodiment, the secondary heat exchanging unit 14A is disposed in the heat recovery unit 15 on a downstream (exit) side of where the secondary heat exchanging unit 14A is installed in the first embodiment.

The plant 10B includes a heat pump system 60. The heat pump system 60 is provided to a heated water supply line $L_{26}$ via which heated water HW (e.g., at 80 degrees Celsius) having exchanged heat in the secondary heat exchanging unit 14A of the secondary heat recovery steam generator 14 is discharged, and is a heat exchanger device for transferring heat of the heated water HW and generates the secondary steam $S_{20}$ (e.g., at 130 to 140 degrees Celsius). Warm water (e.g., at 40 degrees Celsius) having exchanged heat in the heat pump system 60 is returned to the secondary heat exchanging unit 14A via a warm water line $L_{27}$.

The secondary steam $S_{20}$ (at 130 to 140 degrees Celsius) resultant from the heat exchange of the heated water HW in the heat pump system 60 is guided to the reboiler 55 via the first reboiler heat supply line $L_{21}$. The fluid flowing through the secondary heat exchanging unit 14A, and the fluid flowing into the reboiler 55 belong to different systems, and the heated water HW is transferred and the secondary steam $S_{20}$ is generated by exchanging heat in the heat pump system 60. The warm water having exchanged heat is returned to the secondary heat exchanging unit 14A. The condensed water 56 from the reboiler 55 is returned to the heat pump system 60, reheated, and is turned into the secondary steam $S_{20}$.

In the plant 10B, the temperature of the water returned from the heat pump system 60 to the secondary heat exchanging unit 14A can be kept low (e.g., to 40 degrees Celsius). Therefore, it is possible to use the low-temperature side of the heat exchange region in the heat recovery unit 15. Therefore, the amount of heat recovered from the flue gas 12 is increased, compared with that in the plant 10A according to the first embodiment. Therefore, it is possible to suppress a decrease in the power generation efficiency of the GTCC power plant.

The heat pump system 60 according to this embodiment is not limited to one of any particular type, and it is possible to use various types of heat pumps examples of which include a compressor heat pump, an absorption heat pump, an adsorption heat pump, and a reaction pump system.

Third Embodiment

Figure 3:
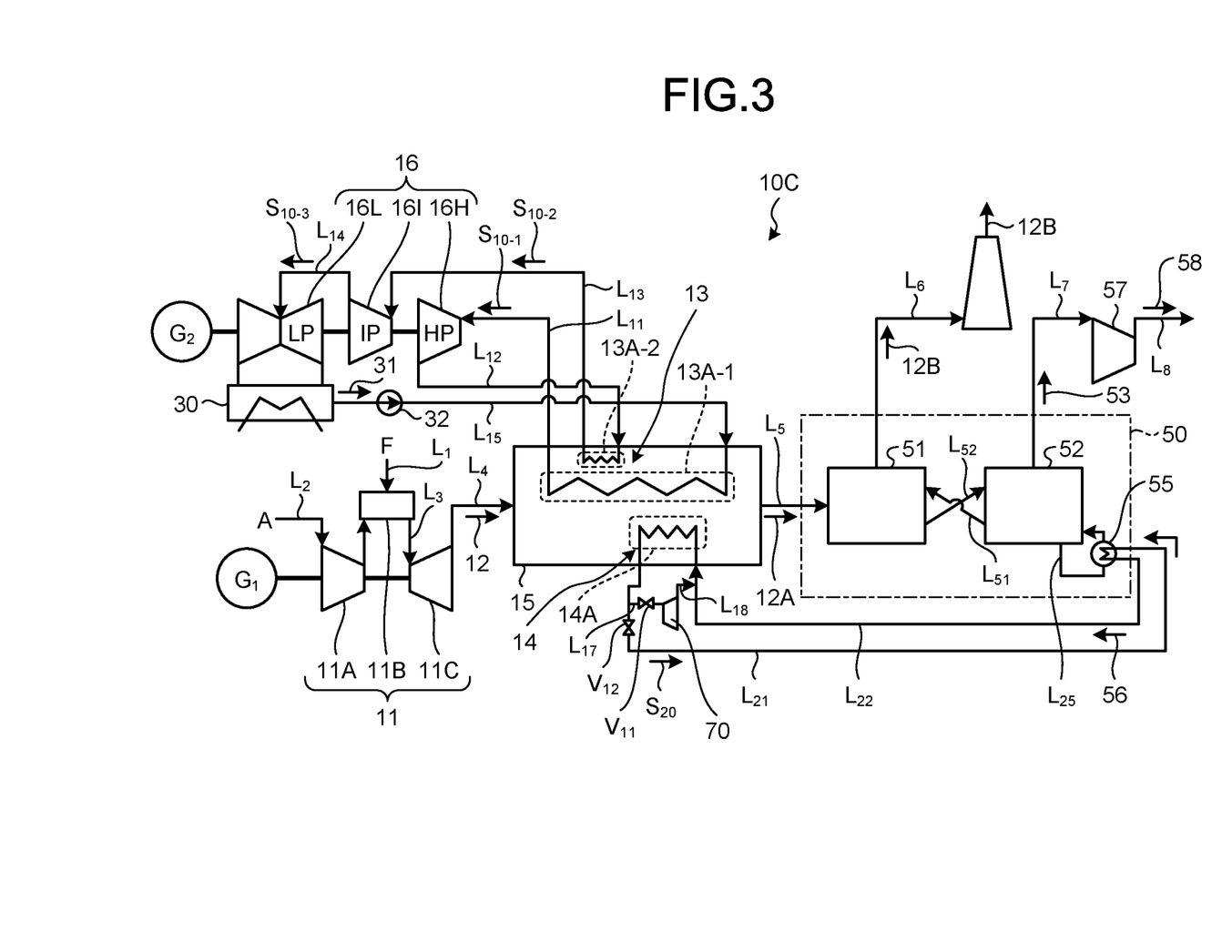
FIG. 3 is a schematic of a plant according to a third embodiment.

A plant according to a third embodiment of the present invention will now be explained with reference to FIG. 3. FIG. 3 is a schematic of the plant according to the third embodiment. Members that are the same as those in the first embodiment will be given the same reference signs, and explanations thereof will be omitted. This plant 10C according to this embodiment includes, in addition to the elements included in the plant 10A, a first steam branching line $L_{17}$ branched from the first reboiler heat supply line $L_{21}$, and an auxiliary steam turbine (e.g., condensate turbine) 70 installed on the first steam branching line $L_{17}$, and is driven by the secondary steam $S_{20}$.

A switching valve $V_{11}$ is installed on the first steam branching line $L_{17}$, and a switching valve $V_{12}$ is installed on the first reboiler heat supply line $L_{21}$ subsequent to the branch. By switching the switching valves $V_{11}$, $V_{12}$ to open and to close, the steam is supplied or stopped against the first steam branching line $L_{17}$ and the first reboiler heat supply line $L_{21}$ subsequent to the branch.

For example, when there is a high demand for the power, the plant 10C closes the switching valve $V_{12}$ and opens the switching valve $V_{11}$, to supply the secondary steam $S_{20}$ into an auxiliary steam turbine 70 to generate power, so that the amount of generated power is increased. When there is a low demand for the power, and the $CO_2$ recovery is to be prioritized, the switching valve $V_{12}$ is opened and the switching valve $V_{11}$ is closed to supply the secondary steam $S_{20}$ to the reboiler 55. The $CO_2$ recovery unit 50 then recovers the $CO_2$ from the flue gas 12.

In the plant 10C, because the heat is recovered independently in the secondary heat exchanging unit 14A included in the secondary heat recovery steam generator 14, the primary steam turbine 16 is affected even less, regardless of whether the $CO_2$ recovery unit 50 is started. One example of the auxiliary steam turbine 70 according to this embodiment is a condensing turbine.

Fourth Embodiment

Figure 4:
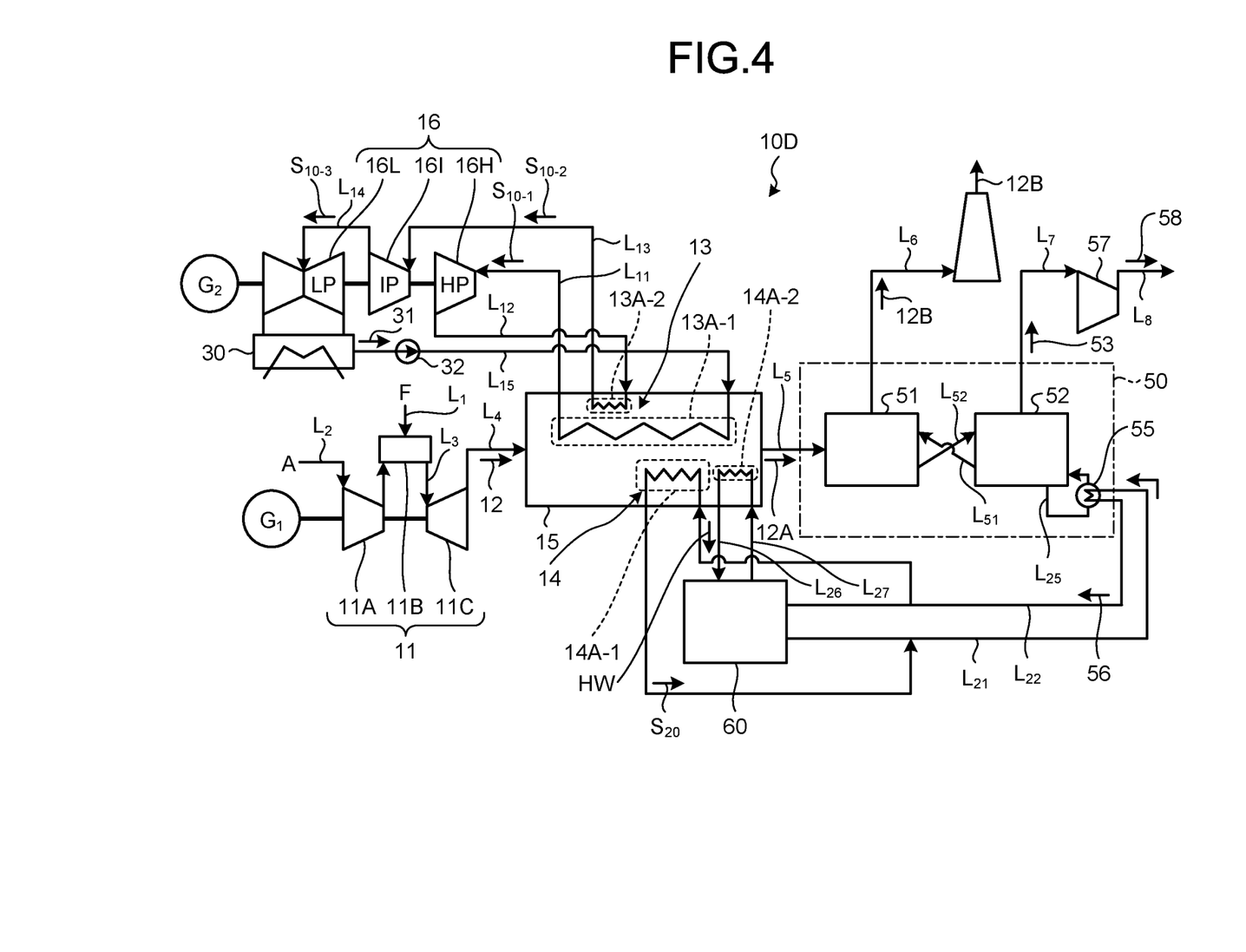
FIG. 4 is a schematic of a plant according to a fourth embodiment.

A plant according to a fourth embodiment of the present invention will now be explained with reference to FIG. 4. FIG. 4 is a schematic of the plant according to the fourth embodiment. Members that are the same as those in the first embodiment and the second embodiment will be given the same reference signs, and explanations thereof will be omitted. In this plant 10D according to this embodiment, the heat pump system 60 in the plant 10B according to the second embodiment is used in the plant 10A according to the first embodiment.

In the plant 10D, the secondary heat recovery steam generator 14 includes a first secondary heat exchanging unit 14A-1, and a second secondary heat exchanging unit 14A-2 provided on the downstream of the first secondary heat exchanging unit 14A-1. The secondary steam $S_{20}$ having exchanged heat in the first secondary heat exchanging unit 14A-1 is guided to the reboiler 55 via the first reboiler heat supply line $L_{21}$, and the heated water HW (e.g., at 80 degrees Celsius) having exchanged heat in second secondary heat exchanging unit 14-2 is guided to the heat pump system 60 via the heated water supply line $L_{26}$.

In the facility of the plant 10B according to the second embodiment (see FIG. 2), an enormous amount of heated water (e.g., three times or so the amount of heat required in the reboiler 55) is required to turn the extracted heated water HW (80 degrees Celsius) into the secondary steam $S_{20}$ (e.g., 130 to 140 degrees Celsius) by subjecting the heated water HW to the heat exchange in the heat pump system 60. In the plant 10D, however, by combining the heat exchange systems having the structures according to the first embodiment and the second embodiment, it becomes possible to directly guide the secondary steam $S_{20}$ (at a temperature equal to or higher than 130 degrees Celsius) extracted from the first secondary heat exchanging unit 14A-1. Therefore, the load of the heat pump system 60 is alleviated, and hence, it is possible to use a smaller heat exchange capacity.

Furthermore, by using the heat pump system 60, it is possible to use the heat in the low-temperature region, which has remained unused in the facility according to the first embodiment, and to reduce the amount of steam to be generated in the secondary heat recovery steam generator 14, compared with that in the facility according to the first embodiment.

The temperature of the secondary steam $S_{20}$ extracted from the first secondary heat exchanging unit 14A-1 may be 130 to 140 degrees Celsius, but it is more preferable to use a slightly higher temperature, e.g., 140 to 150 degrees Celsius, so that it is possible to reduce the amount of steam to be generated in the secondary heat recovery steam generator 14.

Fifth Embodiment

Figure 5:
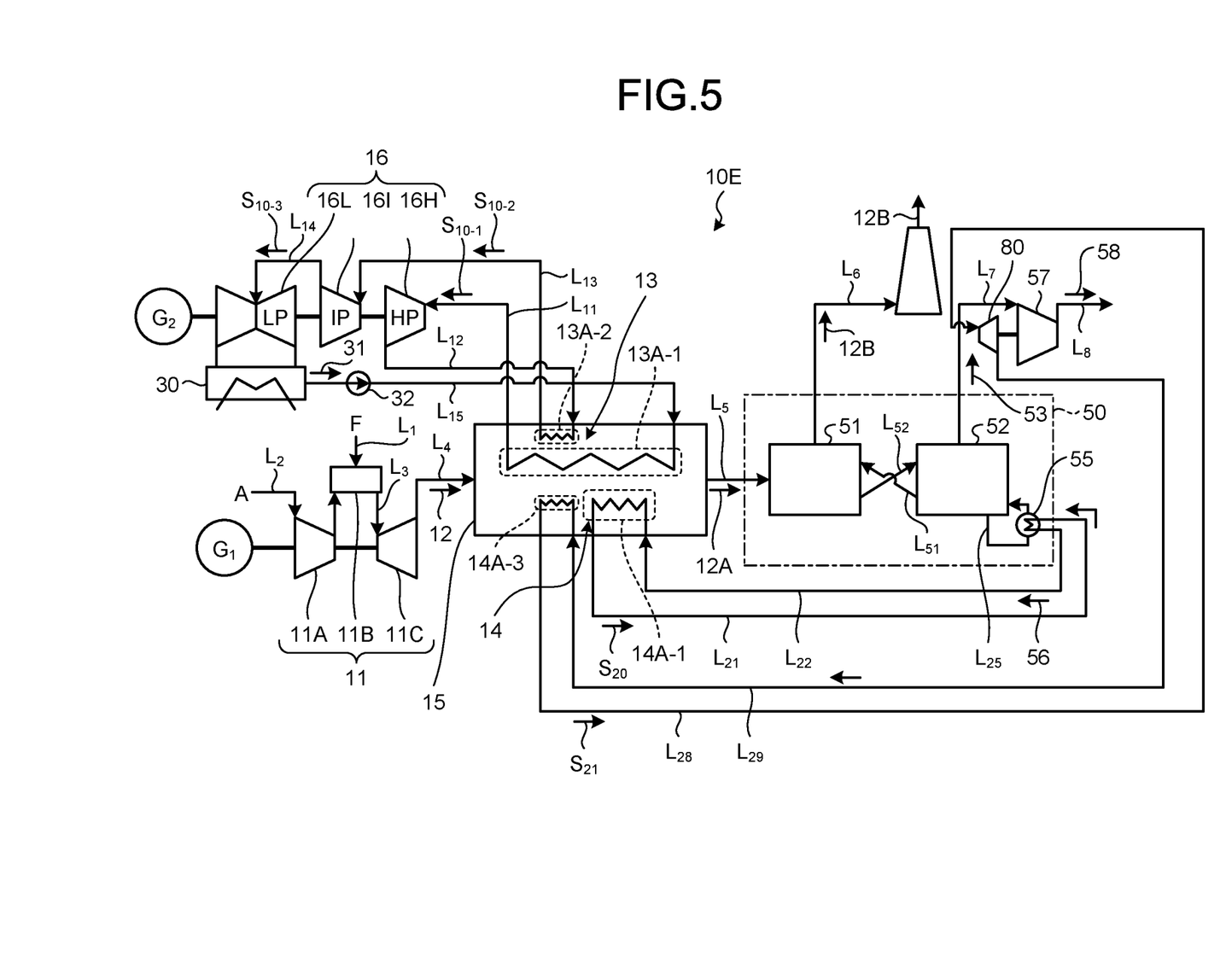
FIG. 5 is a schematic of a plant according to a fifth embodiment.

A plant according to a fifth embodiment the present invention will now be explained with reference to FIG. 5. FIG. 5 is a schematic of the plant according to the fifth embodiment. In this plant 10E according to this embodiment, the secondary heat recovery steam generator 14 includes the first secondary heat exchanging unit 14A-1, and a third secondary heat exchanging unit 14A-3 provided upstream of the first secondary heat exchanging unit 14A-1, in the plant 10A according to the first embodiment. In the plant 10E, the secondary steam $S_{20}$ having exchanged heat in the first secondary heat exchanging unit 14A-1 is guided to the reboiler 55 via the first reboiler heat supply line $L_{21}$, and secondary steam $S_{21}$ (e.g., at 300 degrees Celsius) having exchanged heat in the third secondary heat exchanging unit 14A-3, and having a temperature higher than that of the secondary steam $S_{20}$ (e.g., 130 to 140 degrees Celsius) is guided to a steam turbine 80 for driving the $CO_2$ compressor 57 via a steam line $L_{28}$. The exhausted steam from the steam turbine 80 is returned to the third secondary heat exchanging unit 14A-3 via the exhausted steam line $L_{29}$. The $CO_2$ entrained gas 53 containing the steam released from the absorbent regenerator 52 having its water content removed by a gas-liquid separator not illustrated, is sent to the $CO_2$ compressor 57 that is driven by the steam turbine 80, compressed therein, and is turned into compressed $CO_2$ 58.

In the plant 10E, by sending the secondary steam $S_{21}$ (e.g., at 300 degrees Celsius) in the third secondary heat exchanging unit 14A-3 to the steam turbine 80 for driving the $CO_2$ compressor 57 for compressing $CO_2$, it is possible to use the secondary steam $S_{21}$ to compress $CO_2$.

Sixth Embodiment

Figure 6:
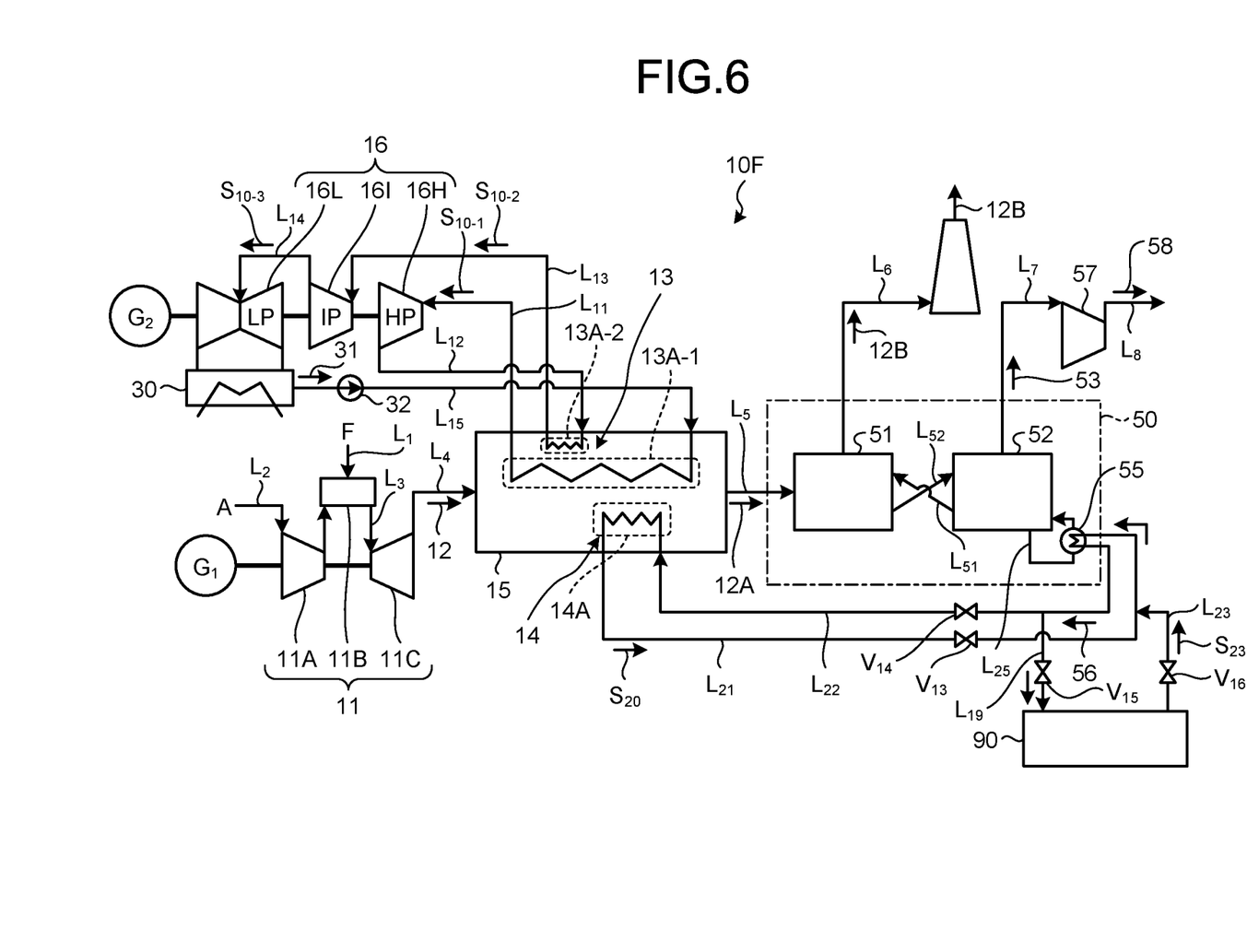
FIG. 6 is a schematic of a plant according to a sixth embodiment.

A plant according to a sixth embodiment of the present invention will now be explained with reference to FIG. 6. FIG. 6 is a schematic of the plant according to the sixth embodiment. This plant 10F according to this embodiment includes, in addition to the elements included in the plant 10A, a condensed water branching line $L_{19}$ branched from the condensed water line $L_{22}$ for returning the condensed water 56 discharged from the reboiler 55, an external heat source 90 installed on the condensed water branching line $L_{19}$, and converting the condensed water 56 into steam, and a second reboiler heat supply line $L_{23}$ guiding secondary steam $S_{22}$ obtained in the external heat source 90 to the first reboiler heat supply line $L_{21}$.

Some examples of the external heat source 90 include an auxiliary steam generator, a heat storage, or a heat source of any natural energy such as solar heat or terrestrial heat, or a heat source generating a chemical process exhausted heat, and being capable of heating reboiler water circulating through the reboiler 55, and turning the water into steam, but the present invention is not limited to these examples.

A switching valve $V_{13}$ is installed on the first reboiler heat supply line $L_{21}$, and a switching valve $V_{14}$ is installed on the condensed water line $L_{22}$. A switching valve Vis is installed on the condensed water branching line $L_{19}$, and a switching valve $V_{16}$ is installed on the second reboiler heat supply line $L_{23}$. When the gas turbine 11 is to be started, the switching valves $V_{13}$, $V_{14}$ are closed, and the switching valves Vis, $V_{16}$ are opened. The reboiler water is then supplied to the external heat source 90, and subjected to the heat exchange to a steam temperature required in the reboiler 55 (130 to 140 degrees Celsius), and steam $S_{23}$ is then supplied to the reboiler 55.

In the conventional GTCC power plant, when steam is to be bled from the primary steam turbine 16, the steam is supplied to the reboiler 55 in the $CO_2$ recovery unit 50 after the primary steam turbine 16 stabilizes, so it takes time to start the $CO_2$ recovery unit 50. By contrast, by installing the external heat source 90 dedicated to the $CO_2$ recovery unit 50, as in the plant 10F, and by generating steam and heating the reboiler 55 therewith, it is possible to reduce the starting time from when the gas turbine 11 is started to when the $CO_2$ recovery unit 50 is started.

Seventh Embodiment

Figure 7:
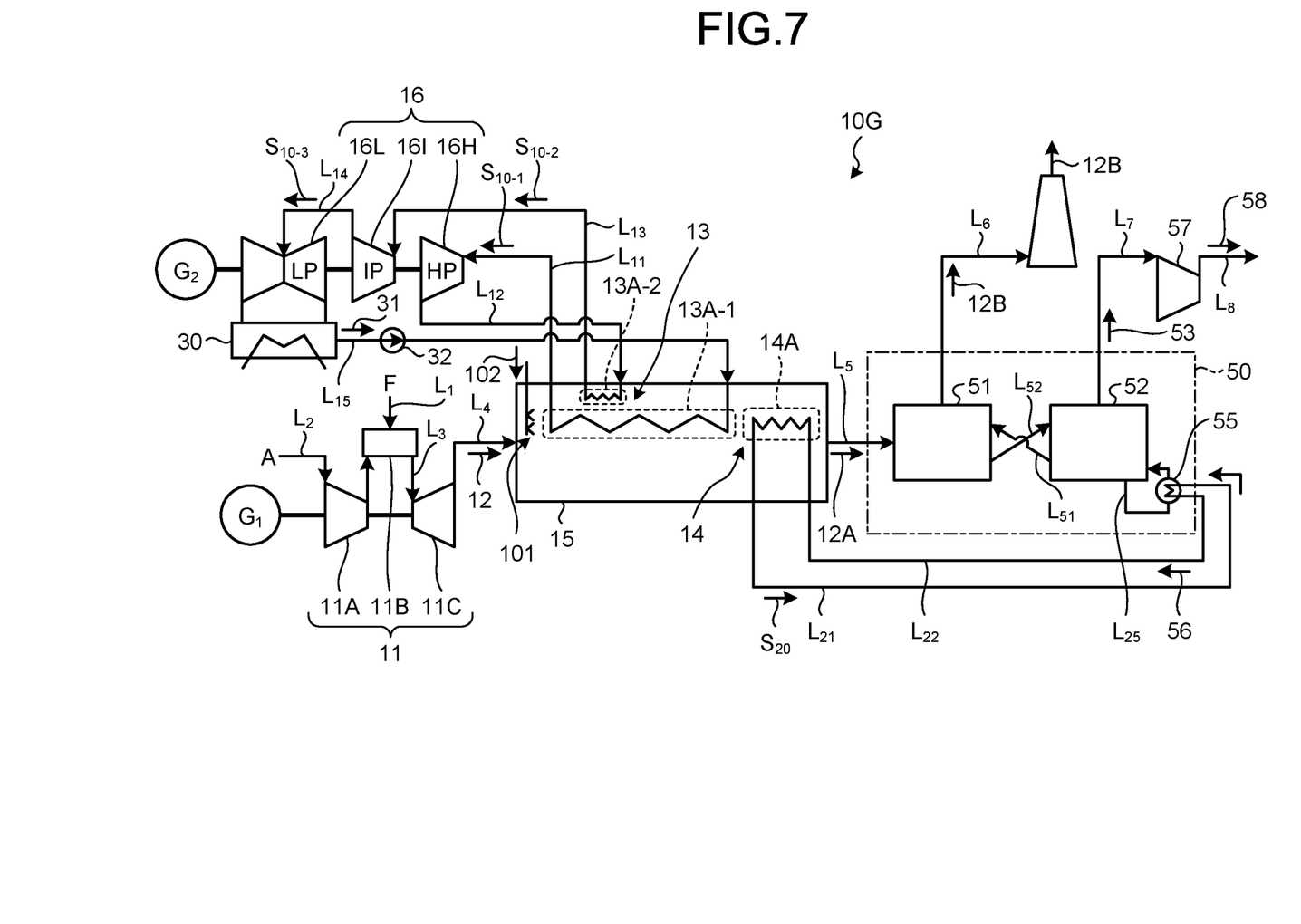
FIG. 7 is a schematic of a plant according to a seventh embodiment.

A plant according to a seventh embodiment of the present invention will now be explained with reference to FIG. 7. FIG. 7 is a schematic of the plant according to the seventh embodiment. In this plant 10G according to this embodiment, the secondary heat recovery steam generator 14 is disposed downstream of the primary heat recovery steam generator 13 in the heat recovery unit 15, in the configuration of the plant 10A according to the first embodiment. The plant 10G also includes a first duct burner 101 that is installed upstream of the primary heat recovery steam generator 13, and that heats the flue gas 12 guided thereto. The first duct burner 101 heats the guided flue gas 12 by combusting fuel gas 102 separately provided. In this manner, the temperature of the flue gas 12 in the heat recovery unit 15 can be increased further.

Generally, a duct burner is installed to ensure the amount of heat of the primary steam for the primary steam turbine 16. By contrast, in the plant 10G, by installing the first duct burner 101, it becomes possible to maintain the amount of power generated by the primary steam turbine 16 to the level achieved without the first duct burner 101, and to ensure the amount of heat in the secondary heat recovery steam generator 14 provided downstream. As a result, in the plant 10G, by directly heating the secondary heat exchanging unit 14A for the steam to be supplied to the reboiler in the $CO_2$ recovery unit 50, the time required in heating the secondary steam $S_{20}$ is reduced, and followability is improved.

Eighth Embodiment

Figure 8:
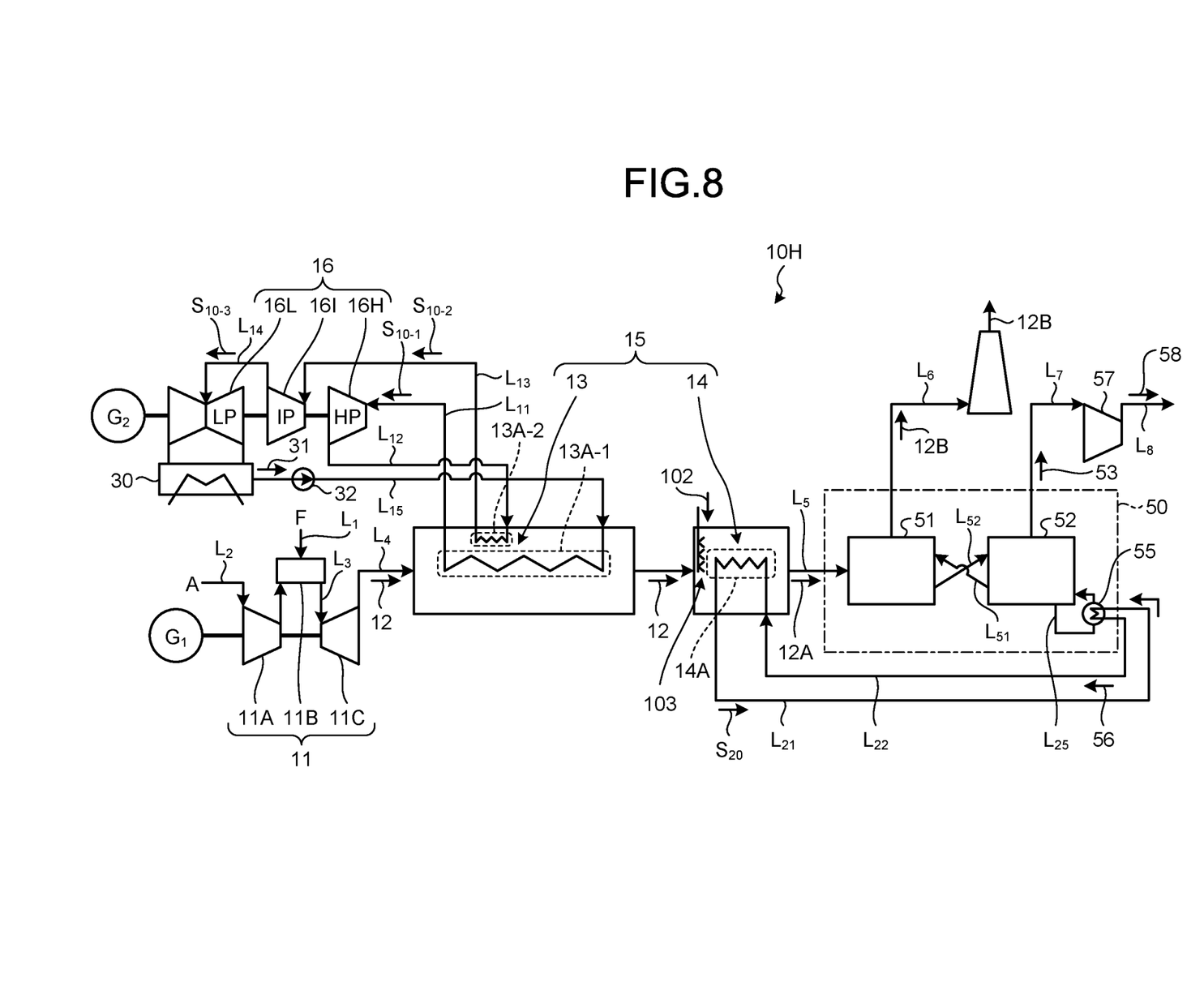
FIG. 8 is a schematic of a plant according to an eighth embodiment.

A plant according to an eighth embodiment of the present invention will now be explained with reference to FIG. 8. FIG. 8 is a schematic of the plant according to the eighth embodiment. In this plant 10H according to this embodiment, the heat recovery unit 15 includes the primary heat recovery steam generator 13, and the secondary heat recovery steam generator 14 that is installed independently on the downstream side of the primary heat recovery steam generator 13, and that recovers the thermal energy of the flue gas 12A having exchanged heat in the primary heat recovery steam generator 13, in the plant 10A according to the first embodiment. The secondary heat recovery steam generator 14 also includes a second duct burner 103 that is installed on an upstream side, and that heats the flue gas 12A having exchanged heat in the primary heat recovery steam generator 13. In the plant 10H, by causing the second duct burner 103 to combust the fuel gas 102 separately supplied to the secondary heat recovery steam generator 14, the flue gas 12 guided thereto is heated. In this manner, the temperature of the flue gas 12 inside the secondary heat recovery steam generator 14 can be increased further.

In the plant 10H, by installing the primary heat recovery steam generator 13 and the secondary heat recovery steam generator 14 separately, and by directly heating the secondary heat exchanging unit 14A in the secondary heat recovery steam generator 14 for recovering the $CO_2$, with the second duct burner 103 provided at an upstream entrance of the secondary heat recovery steam generator 14, the time required in heating the steam is reduced, and the followability is improved, compared with the facilities according to the first to the seventh embodiments.

Although not illustrated, it is also possible to modify the structure according to this embodiment by adding the facilities according to the second to the seventh embodiments.

REFERENCE SIGNS LIST 10A to 10H plant
11 gas turbine
11A air compressor
11B combustor
11C power turbine
12 flue gas
13 primary heat recovery steam generator
13A primary heat exchanging unit
14 secondary heat recovery steam generator
14A secondary heat exchanging units
14A-1 to 14A-3 first to third secondary heat exchanging units
15 heat recovery unit
16 primary steam turbine
16H high-pressure steam turbine
16I medium-pressure steam turbine
16L low-pressure steam turbine 50 CO$_2$ recovery unit
51 CO$_2$ absorber
52 absorbent regenerator
53 CO$_2$ entrained gas
55 reboiler
56 condensed water
57 CO$_2$ compressor
58 compressed CO$_2$
60 heat pump system
70 auxiliary steam turbine
80 steam turbine
90 external heat source
101 first duct burner
102 fuel gas
103 second duct burner
S$_{10}$ primary steam
S$_{20}$, S$_{22}$ secondary steam
L$_{17}$ first steam branching line
L$_{19}$ condensed water branching line
L$_{21}$ first reboiler heat supply line
L$_{22}$ condensed water line
L$_{23}$ second reboiler heat supply line

The invention claimed is:

1. A plant comprising:
a gas turbine;
a heat recovery unit that includes a primary heat recovery steam generator in which a primary heat exchanging unit generates primary steam by exchanging heat that is thermal energy of flue gas from the gas turbine, and a secondary heat recovery steam generator installed independently from the primary heat exchanging unit, and in which a secondary heat exchanging unit generates heated water by exchanging heat that is thermal energy of the flue gas having exchanged heat in the primary heat exchanging unit included in the primary heat recovery steam generator;
a primary steam turbine that is driven by the primary steam generated by the primary heat recovery steam generator;
a CO$_2$ recovery unit that includes a reboiler for recovering CO$_2$ contained in the flue gas discharged from the heat recovery unit;
a heated water supply line via which the heated water having exchanged heat in the secondary heat recovery steam generator is drawn off;
a heat exchanger device that transfers heat of the heated water drawn via the heated water supply line and generates secondary steam; and
a first reboiler heat supply line via which the secondary steam is guided to the reboiler.

2. The plant according to claim 1, wherein
the secondary heat recovery steam generator includes a first secondary heat exchanging unit, and a second secondary heat exchanging unit provided on a downstream side of the first secondary heat exchanging unit,
the secondary steam having exchanged heat in the first secondary heat exchanging unit is guided to the reboiler via the first reboiler heat supply line, and
the heated water having exchanged heat in the second secondary heat exchanging unit is guided to a heat exchanger device via the heated water supply line so that the heat of the heated water is transferred and the secondary steam is generated, and the secondary steam is guided to the reboiler.

3. A plant comprising:
a gas turbine;
a heat recovery unit that includes a primary heat recovery steam generator in which a primary heat exchanging unit generates primary steam by exchanging heat that is thermal energy of flue gas from the gas turbine, and a secondary heat recovery steam generator installed independently from the primary heat exchanging unit, and in which a secondary heat exchanging unit generates secondary steam by exchanging heat that is thermal energy of the flue gas having exchanged heat in the primary heat exchanging unit included in the primary heat recovery steam generator;
a primary steam turbine that is driven by the primary steam generated by the primary heat recovery steam generator;
a CO$_2$ recovery unit that includes a reboiler for recovering CO$_2$ contained in the flue gas discharged from the heat recovery unit; and
a first reboiler heat supply line via which the secondary steam generated by the secondary heat recovery steam generator is guided to the reboiler, wherein
the secondary heat recovery steam generator includes a first secondary heat exchanging unit, and a third secondary heat exchanging unit provided on an upstream side of the first secondary heat exchanging unit,
the secondary steam having exchanged heat in the first secondary heat exchanging unit is guided to the reboiler via the first reboiler heat supply line, and
the secondary steam having exchanged heat in the third secondary heat exchanging unit, and having a temperature higher than a temperature of the secondary steam having exchanged heat in the first secondary heat exchanging unit is guided into a steam turbine for driving a CO$_2$ compressor.

4. The plant according to claim 1, further A plant comprising:
a gas turbine;
a heat recovery unit that includes a primary heat recovery steam generator in which a primary heat exchanging unit generates primary steam by exchanging heat that is thermal energy of flue gas from the gas turbine, and a secondary heat recovery steam generator installed independently from the primary heat exchanging unit, and in which a secondary heat exchanging unit generates secondary steam by exchanging heat that is thermal energy of the flue gas having exchanged heat in the primary heat exchanging unit included in the primary heat recovery steam generator;
a primary steam turbine that is driven by the primary steam generated by the primary heat recovery steam generator;
a CO$_2$ recovery unit that includes a reboiler for recovering CO$_2$ contained in the flue gas discharged from the heat recovery unit;
a first reboiler heat supply line via which the secondary steam generated by the secondary heat recovery steam generator is guided to the reboiler;
a condensed water branching line that is branched from a condensed steam line for discharging condensed water from the reboiler;
an external heat source that is installed on the condensed water branching line, and that converts the condensed water to steam; and
a second reboiler heat supply line via which steam obtained in the external heat source is guided to the first reboiler heat supply line.

5. The plant according to claim 1, further comprising a first duct burner that is installed on an upstream side of the primary heat recovery steam generator, and that heats the flue gas.

6. The plant according to claim 1, further comprising:
the secondary heat recovery steam generator that is installed independently on a downstream side of the primary heat recovery steam generator, and that recovers thermal energy from the flue gas discharged after having exchanged heat in the primary heat recovery steam generator; and
a second duct burner that is installed on an upstream side of the secondary heat recovery steam generator, and that heats the flue gas having exchanged heat in the primary heat recovery steam generator.

7. An air pollution control method for recovering $CO_2$ from a gas turbine combined cycle power plant, the air pollution control method comprising:
a primary heat recovery step at which a primary heat exchanging unit exchanges heat that is thermal energy of flue gas from the gas turbine;
a secondary heat recovery step that is independent from the primary heat recovery step, and at which thermal energy of the flue gas having exchanged heat at the primary heat recovery step in the primary heat exchanging unit is recovered;
a $CO_2$ recovery step that includes a reboiler for recovering $CO_2$ contained in the flue gas discharged at the secondary heat recovery step;
a first reboiler heat supply step at which secondary steam having exchanged heat at the secondary heat recovery step is guided to the reboiler;
a condensed water branching step at which a part of condensed water from the reboiler is branched;
an external heat source step at which the condensed water branched is converted to steam by an external heat source; and
a second reboiler heat supply step at which the steam obtained in the external heat source step is guided to the secondary steam.

* * * * *

UNITED STATES PATENT AND TRADEMARK OFFICE
CERTIFICATE OF CORRECTION

| | | |
|---|---|---|
| PATENT NO. | : 11,306,636 B2 | Page 1 of 1 |
| APPLICATION NO. | : 17/050260 | |
| DATED | : April 19, 2022 | |
| INVENTOR(S) | : Tatsuya Tsujiuchi et al. | |

It is certified that error appears in the above-identified patent and that said Letters Patent is hereby corrected as shown below:

In the Claims

Column 12, Claim 4, Line 34-35, "The plant according to claim 1, further A plant comprising:" should read "A plant comprising:"

Signed and Sealed this
Seventh Day of June, 2022

Katherine Kelly Vidal
*Director of the United States Patent and Trademark Office*